· US010469413B2

(12) United States Patent
Anderson

(10) Patent No.: US 10,469,413 B2
(45) Date of Patent: Nov. 5, 2019

(54) UPDATING THE RECIPIENTS OF A PREVIOUSLY DELIVERED ELECTRONIC MESSAGE

(71) Applicant: Citrix Systems, Inc., Fort Lauderdale, FL (US)

(72) Inventor: Nathan Anderson, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 809 days.

(21) Appl. No.: 13/886,991

(22) Filed: May 3, 2013

(65) Prior Publication Data

US 2014/0330910 A1 Nov. 6, 2014

(51) Int. Cl.
*G06F 15/16* (2006.01)
*H04L 12/58* (2006.01)
*G06Q 10/10* (2012.01)

(52) U.S. Cl.
CPC .......... *H04L 51/04* (2013.01); *G06Q 10/107* (2013.01); *H04L 51/16* (2013.01)

(58) Field of Classification Search
CPC ..................................................... G06F 15/16
USPC ....................................................... 709/206
See application file for complete search history.

(56) References Cited

U.S. PATENT DOCUMENTS

| 8,244,822 B1* | 8/2012 | Lowry | H04L 67/26 709/206 |
|---|---|---|---|
| 8,468,209 B2* | 6/2013 | Keohane | H04L 51/24 709/206 |
| 2002/0099775 A1* | 7/2002 | Gupta | G06Q 10/107 709/205 |
| 2003/0037114 A1* | 2/2003 | Nishio | H04L 51/28 709/206 |
| 2005/0066009 A1* | 3/2005 | Keohane | H04L 51/24 709/207 |
| 2007/0076228 A1* | 4/2007 | Apelbaum | G06Q 10/10 358/1.1 |
| 2008/0071867 A1* | 3/2008 | Pearson | G06Q 10/107 709/206 |

(Continued)

OTHER PUBLICATIONS

International Search Report and Written Opinion, PCT/US2014/035078, dated Sep. 17, 2014.

(Continued)

*Primary Examiner* — Moustafa M Meky
*Assistant Examiner* — Sm Z Islam
(74) *Attorney, Agent, or Firm* — Banner & Witcoff, Ltd.

(57) ABSTRACT

A system and method for updating the list of recipients of a previously delivered email message are provided. An electronic message server may store an electronic message and a list of recipients associated with that electronic message. Recipient information identifying a new recipient to be added to the list of recipients may be received from an email client. The list of recipients may be updated based on the recipient information such that the new recipient is added to the list of recipients for the electronic message. The recipient information may be provided to another electronic message client that stores a copy of the electronic message as well as a copy of the list of recipients. The copy of the list of recipients may also be updated based on the recipient information such that the new recipient is added to the copy of the list of recipients.

20 Claims, 9 Drawing Sheets

(56) References Cited

U.S. PATENT DOCUMENTS

| | | | |
|---|---|---|---|
| 2008/0235335 A1* | 9/2008 | Hintermeister | G06Q 10/107 709/206 |
| 2009/0037542 A1 | 2/2009 | Chen et al. | |
| 2009/0125596 A1* | 5/2009 | Naick | G06Q 10/107 709/206 |
| 2009/0248823 A1* | 10/2009 | Li | H04L 12/5855 709/206 |
| 2009/0271409 A1* | 10/2009 | Ghosh | G06Q 10/10 |
| 2010/0131604 A1* | 5/2010 | Portilla | G06Q 10/107 709/206 |
| 2011/0196933 A1 | 8/2011 | Jackson et al. | |
| 2012/0198017 A1* | 8/2012 | LeVasseur | H04L 51/24 709/206 |

OTHER PUBLICATIONS

"UpdateItem Operation" retrieved online at http://msdn.mirosoft.com/en-us/libary/exchange/aa581084(v=exchg.140).aspx on May 21, 2013.

\* cited by examiner

UPDATING THE RECIPIENTS OF A PREVIOUSLY DELIVERED ELECTRONIC MESSAGE

TECHNICAL FIELD

Aspects described herein generally relate to managing electronic messages. More specifically, various aspects provide approaches to updating a list of recipients of a previously delivered electronic message.

BACKGROUND

An email message ("email") is one type of electronic message that has become a popular method of communication between individuals. In particular, email has become an important tool used to conduct business and engage in other various enterprises. Businesses may rely on email to enable remote communication between individuals.

Conventional email systems may provide email services to traditional desktop computers and, relatively more recently, to mobile computing devices. An email system may include an email server in signal communication with multiple email clients respectively residing at multiple computing devices. Email servers and email clients may employ a variety of well-known protocols to exchange email messages. Individuals may utilize email clients to access email servers that are responsible for managing the distribution of emails between those individuals. Some conventional email systems may also provide functionality to manage contacts, calendars, and tasks.

In some situations, it is common practice for an individual, the sender, to send an email to multiple recipients. One or more of the recipients may send a reply email in response to receipt of the original email. Recipients may also send reply emails in response to receipt of a previous reply email. The original email and the subsequent reply emails comprise what may be referred to as an email thread (or email string).

When communicating with multiple recipients, it is not uncommon for an intended recipient to be inadvertently left off the original email. Stated differently, individuals may sometimes fail to include an intended recipient in the list of recipients of the email. Upon realizing that the intended recipient was left off the original email, an individual may add the intended recipient to a reply email in an attempt to add the intended recipient to the email thread.

Adding a new recipient to a reply email, however, results in two email threads: i) the new email thread that includes the new recipient and ii) the original email thread that does not include the new recipient. In some circumstances, individuals may continue to send reply emails to the original email thread that does not include the new recipient. As a result, the new email recipient may not receive the subsequent reply emails to the original email thread. Therefore, a need exists for updating a list of recipients of a previously delivered email message to include a new recipient.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards updating the list of recipients of a previously delivered electronic message such as an email. When an individual updates the list of recipients of an email stored at one email client, the update is replicated at a copy of the email stored at another email client. Updating the list of recipients may include adding a new recipient or removing a current recipient.

A first aspect described herein provides a method for updating the list of recipients of a previously delivered email message. An electronic message server may store an electronic message and a list of recipients associated with that electronic message. Recipient information may be received from an email client, and the recipient information may identify a new recipient to be added to the list of recipients. The list of recipients may be updated based on the recipient information such that the new recipient is added to the list of recipients for the electronic message. The recipient information may be provided to another electronic message client that stores a copy of the electronic message as well as a copy of the list of recipients. The copy of the list of recipients may also be updated based on the recipient information such that the new recipient is added to the copy of the list of recipients.

A second aspect described herein provides a system for managing electronic messages. The system may include a data store that stores an electronic message and a list of recipients associated with the electronic message. An interface may receive recipient information from an electronic message client, and the recipient information may identify a new recipient to add to the list of recipients. An update module may update the list of recipients based on the recipient information such that the new recipient is included in the list of recipients. A notification module may provide the recipient information to another electronic message client. Receipt of the recipient information at the other electronic message client may cause the other electronic message client to update a copy of the list of recipients associated with a copy of the electronic message based on the recipient information. The new recipient may thus be added to the copy of the list of recipients at the other electronic message client.

Some aspects described herein provide that the electronic message may be an email message, and the list of recipients may be updated to also remove a current recipient. If the electronic message is associated with an electronic message thread, then each electronic message associated with the electronic message thread may be updated to add a new recipient or remove a current recipient. A change log may indicate when a new recipient is added to an electronic message and when a current recipient is removed from an electronic message. If the new recipient is associated with a third-party electronic message system, then each electronic message of an electronic message thread may be transmitted to the third-party electronic message system when a new recipient is added to the list of recipients. The recipient information may be provided to the other electronic message client via a push or in response to a sync request.

Additional aspects will be appreciated with the benefit of the disclosures set forth in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards updating the list of recipients of a previously delivered electronic message such as an email. When an individual updates the list of recipients of an email stored at one email client, the update is replicated at a copy of the email stored at another email client. Updating the list of recipients may include adding a new recipient or removing a current recipient. A change log may identify recipients added to and/or removed from a previously delivered electronic message.

The discussion set forth below describes various aspects within the context of a particular type of electronic message, in particular, email messages. Email may also be referred to as "electronic mail" or "e-mail." It will be appreciated, however, that the aspects described and the principles disclosed herein may be employed with respect to other types of electronic messages. Other types of electronic messages may include, for example, Short Message Service (SMS) text messages, Multimedia Messaging Service (MMS) messages, instant messages, chat messages, and other types of electronic messages capable of being transmitted to multiple recipients.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computer Architecture

Figure 1:
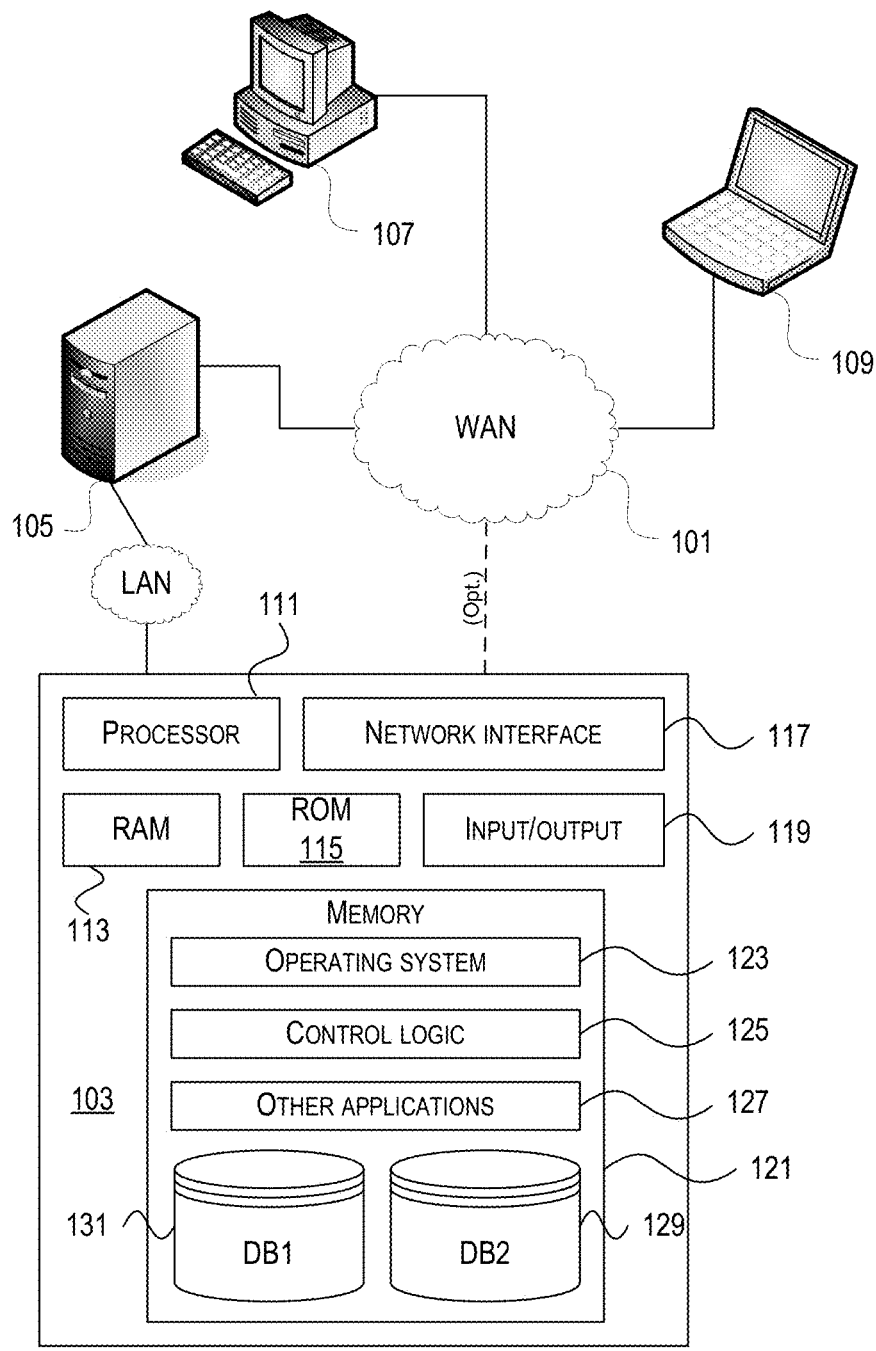
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the disclosure in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
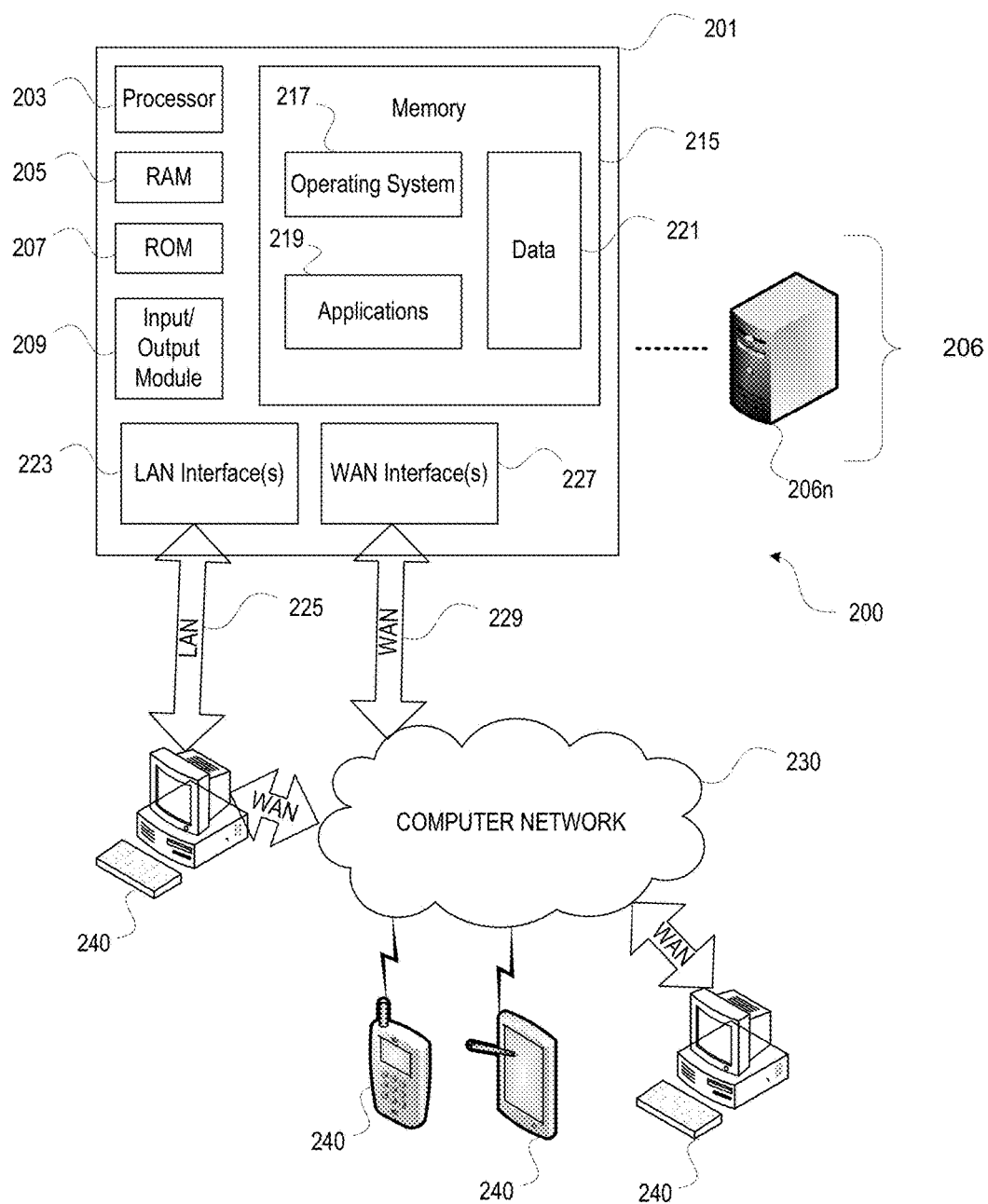
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, an SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
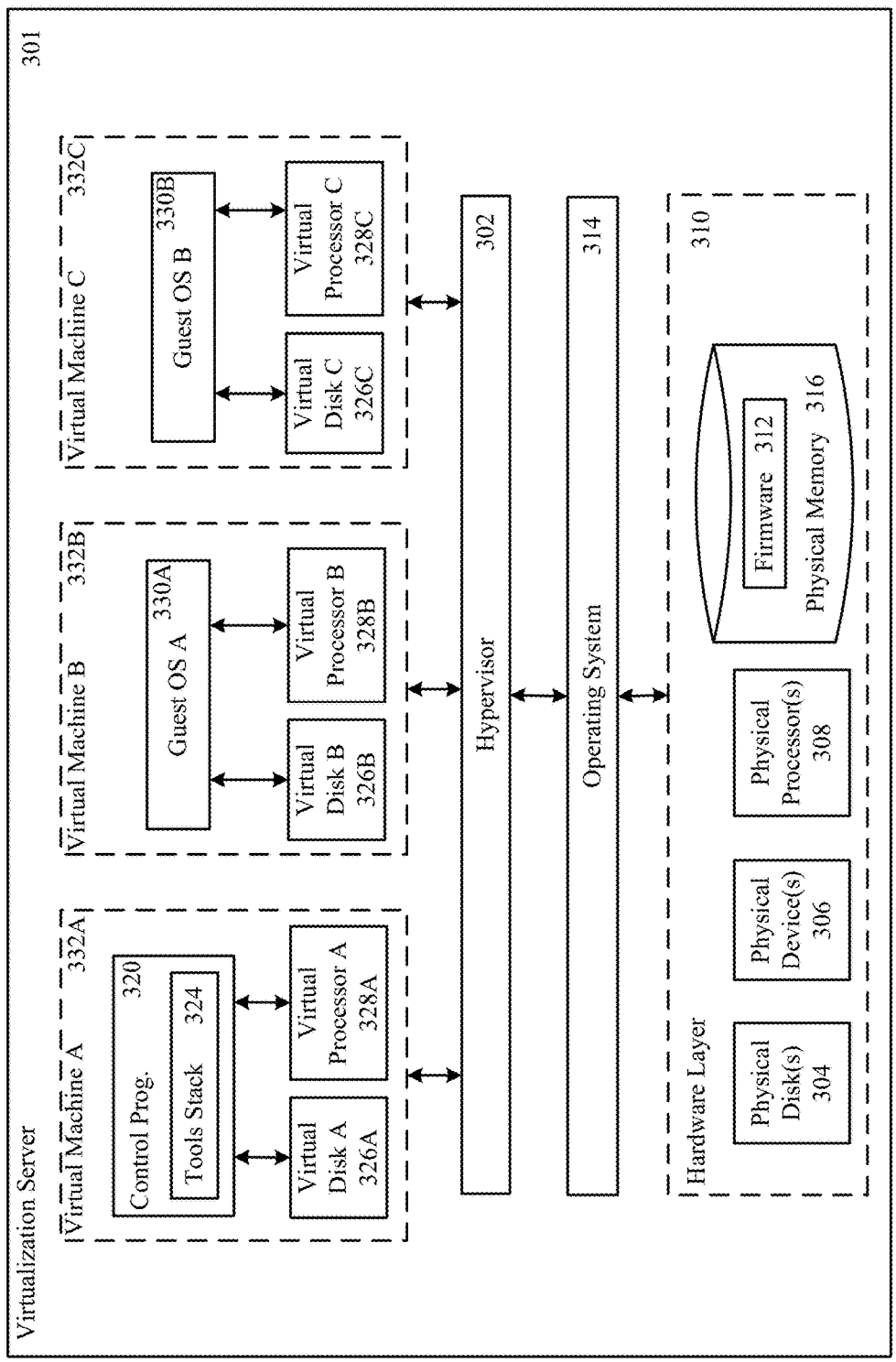
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
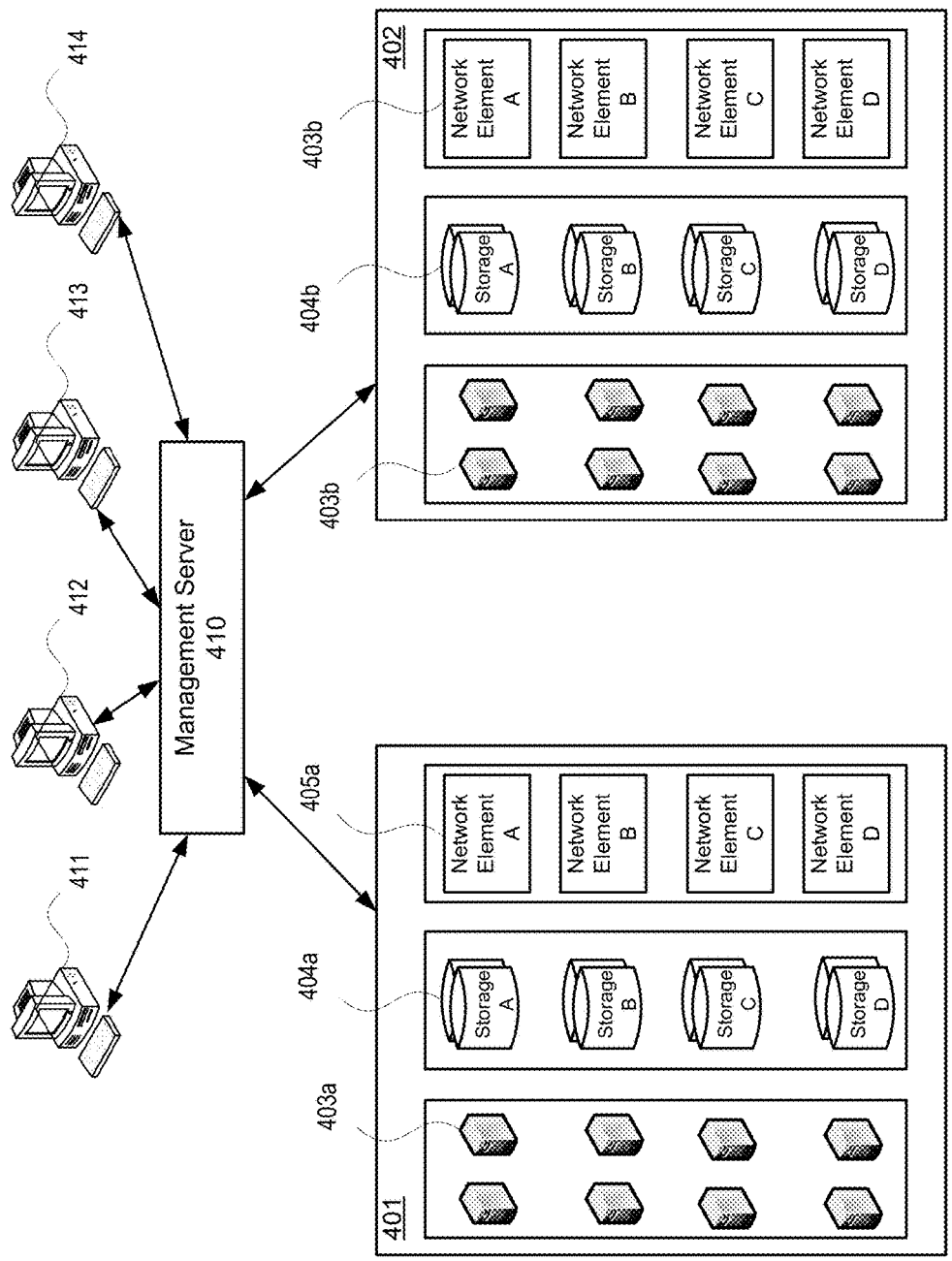
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Updating the Recipients of a Previously Delivered Electronic Message

Figure 5:
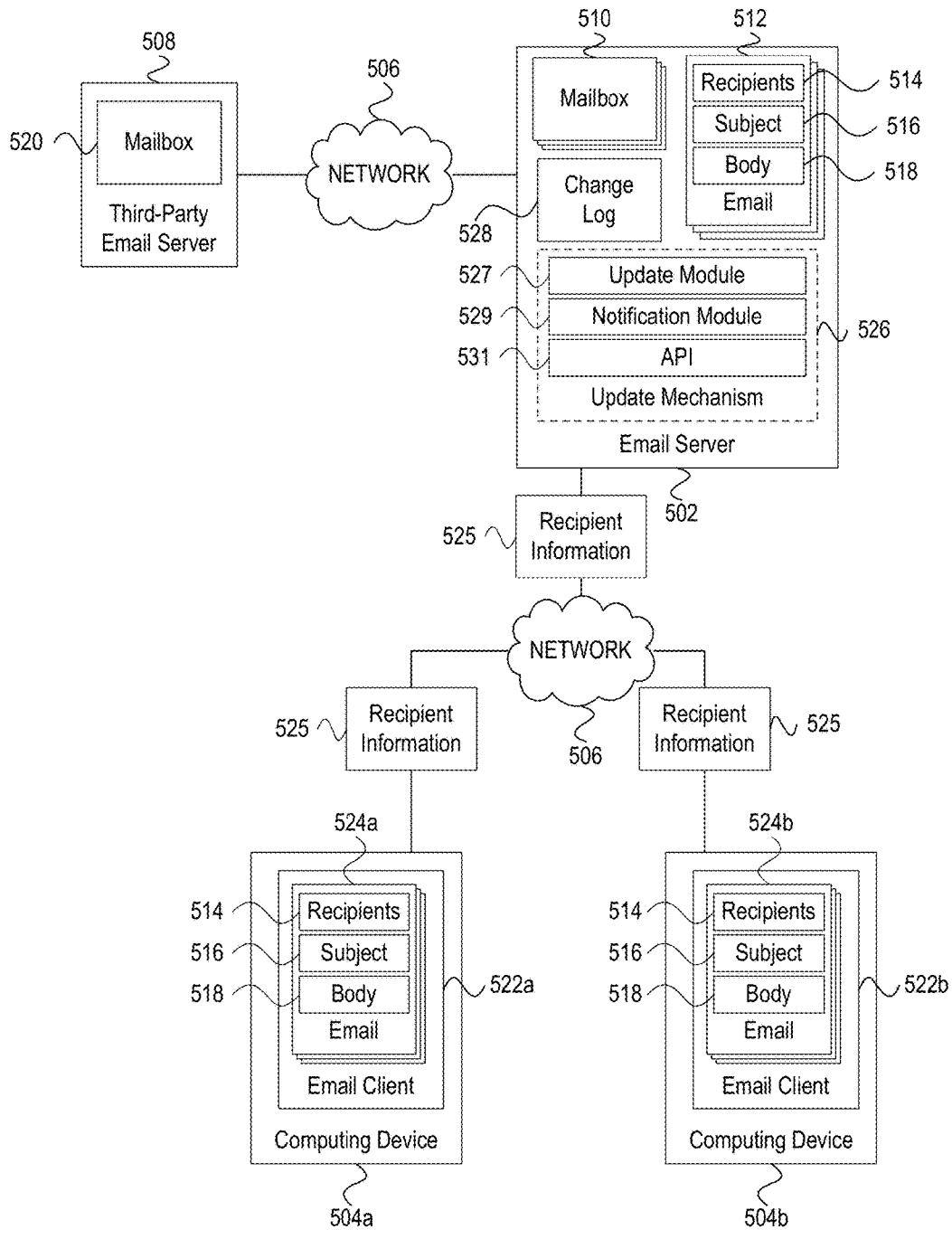
FIG. 5 depicts an illustrative email system that may be used in accordance with one or more illustrative aspects described herein.

Referring to FIG. 5, an illustrative email system 500 that may be used in accordance with one or more of the illustrative aspects described is shown. The email system 500 in this example includes an electronic message server 502 in signal communication with multiple computing devices 504a and 504b (504 generally) via a network 506. The electronic mail server 502 may be an email server as shown by way of example in FIG. 5. The email server 502 may also be in signal communication with a third-party electronic message system, e.g., a third-party email server 508 via a network 506 as seen in FIG. 5.

The email server 502 may facilitate the exchange of emails between the computing devices 504 and/or the third-party email server 508. Various well-known protocols may be selectively employed to provide emails to the computing devices 504 of the third-party email server 508. The email server may be identified by a domain name, e.g., domain_1.com. The email server 502 may maintain a mailbox 510 for a user, which may be uniquely identified by an email address associated with the user. The email address may be in the form username_x@domain_1.com. The domain portion of the email address (e.g., domain_1.com) indicates that the email server 502 may accept email sent to email addresses having that domain name.

The email server 502 may maintain multiple mailboxes 510 respectively associated with multiple users. The mailbox 510 may be associated with one or more emails 512 stored at the email server 502 (e.g., at a data store). The email server 502 may store the emails 512 in a data store such as, for example, a database. Additionally, an email database may implement an email database schema that defines the properties of and relationships between the mailboxes 510 and the emails 512. The database schema may also define the various properties for the emails including, e.g., the list of recipients 514, the subject 516 of the email, the body 518 of the email, and other types of email properties. Other types of email properties may include, for example, the date on which the email was sent, the date on which the email was read by a recipient, and so forth. The schema may also define various properties for the recipients included in the list of recipients 514, e.g., a status indicating whether the recipient is a current recipient or a recipient that has been removed from the email.

The recipient list 514 may include one or more email addresses, which may or may not be associated with the domain name of the email server 502, e.g., address_x@domain_1.com and address_y@domain_2.com. In this example, the domain name, domain_2.com, may correspond to the third-party email server 508. Where the recipient list 514 includes an email address associated with the email server 502, the email server may store a copy of the email 512 in the email database and associate the email with the mailbox for the recipient. An email 512 may be associated with multiple mailboxes 510 where the recipient list 514 includes multiple email addresses associated with the email server 502. Where the recipient list includes an email address associate with a third-party email server 508, the email server 502 may send the email to the third-party email server for storage and/or association with a mailbox 520 at the third-party email server.

Moreover, an email 512 may include multiple recipient lists 514. It will be appreciated that an email 512 may include a general recipient list corresponding the "to:" field of an email, a carbon copy (cc) recipient list corresponding to the "cc:" field of the email, and a blind carbon copy (bcc) recipient list corresponding to the "bcc:" field of the email. In this regard, a recipient in the general recipient list of the email may be referred to as a general recipient; a recipient in the cc recipient list of the email may be referred to as a cc recipient; and a recipient in the bcc recipient list may be referred to as a bcc recipient.

User may utilize the respective computing devices 504 to access the email 512 provided by the email server 502. The computing devices 504a and 504b may respectively include electronic message clients 522a or 522b (522 generally). The electronic message clients 522a and 522b may be email clients for communicating with the email server 502 as shown by way of example in FIG. 5. The email client 522 may be configured to receive emails 512 from the email server 502. Upon receipt of the emails 512 from the email server 502, an email client 522a or 522b may store a local copy of the email 524a or 524b (524 generally).

As noted above, once an email is sent, the recipients may reply to the email thereby creating an email thread that comprises multiple emails. For clarity, the following terminology is adopted for the present disclosure. The first email sent that initiates the email thread may be referred to as the original email. Any emails of the email thread sent subsequent to the original email may be referred to as a reply email. A reply email may be sent in response to the original email or in response to another reply email. Additionally, an email that has successfully been sent from one email client 522a at one computing device 504a and successfully received at another email client 522b at another computing device 504b may be referred to as a previously delivered email.

Furthermore, the following terminology is adopted in the present disclosure to describe the emails 512 stored remotely at the email server 502 and the emails 524 stored locally at the computing devices 504. An email 512 stored remotely at the email server 502 may be referred to as the master copy of the email. Accordingly, master copies 512 may include, e.g., a master copy of an original email and master copies of reply emails. An email 524 stored locally at the computing device 504 may be referred to as the local copy of the email. Local copies 524 may similarly include, e.g., a local copy of an original email and local copies of reply emails.

The email system 500 may employ various approaches to provide emails to the email clients 522 at the computing devices 504. In one example approach, the email server 502 may download information (e.g., new emails) to the email client 522 in response to receipt of an update request from the email client. In another example approach, the email server 502 may push new emails to the email client 522 without receiving a request from the email client. In a further example approach, the email server 502 and the email client 522 may be configured to sync with one another such that the information at the email server is consistent with information at the email client.

As noted above, there exists a need to update the list of recipients 514 of an email. Updating the list of recipients 514 may include adding a recipient to the list or removing a recipient from the list. Accordingly, the following terminology is adopted in the present disclosure to describe the individuals include in the list of recipients 514 of a previously delivered email. A recipient that was originally included in the list of recipients 514 when the email was first sent may be referred to as an original recipient. A recipient that has been added to the list of recipients 514 of a previously delivered email may be referred to as a new recipient. A recipient that has been removed from the list of recipients 514 of a previously delivered email may be referred to as a removed recipient. A recipient included in the list of recipients of the most recent and up-to-date version of a previously delivered email may be referred to as a current recipient. Accordingly, it will thus be appreciated that current recipients may include both original recipients as well as new recipients.

Updating the list of recipients of a previously delivered email address will be discussed in further detail below. In general, a user may select a previously delivered email 524a at an email client 522a and update the list of recipients 514 of the local copy of the email, e.g., add a new recipient or remove a recipient. The email client 522a may transmit recipient information 525 corresponding to the update to the email server 502, and the email server may apply the update to the master copy 512 of the email based on the recipient information received. The email server 502 may then propagate the recipient information 525 to another email client 522b where the local copy of the email 524a may be similarly updated. In this way, a user may add or remove a recipient at a local copy of an email 524a at one email client 522a, and that change will be automatically replicated in the local copy of the email 524b at another email client 522b.

In order to implement the ability to update a previously delivered email message, the email server 502 may include an update mechanism 526. The update mechanism 526 may include, for example, an update module 527 configured to access the master copies of the emails 512 and their associate lists of recipients 514; a notification module 529 configured to provide a notification to the email clients 524 indicating that the list of recipients for a previously delivered email message has been updated; and an application programming interface (API) 531 that receives the recipient information 525 from the email clients. The API 526 may include various function calls to initiate updates to the properties of the emails 512 including, for example, a function call to initiate updates to the list of recipients 514 of an email. Accordingly, an email client may utilize the API 529 to invoke the functionality of the update module 527 and the notification module 529 in order to update the master copy of the email 512 stored at the email server 502. In some example implementations, an email client 522 may invoke a function of the API 531, identify one or more recipients, and specify whether those recipients should be added or removed from the list of recipients 514 of the master copy of the email 512. In other example implementations, an email client 522 may invoke a function at the API 531 to provide the email server 502 with the recipient information 525. The notification module 529 may also be configured to determine whether a new recipient is associated with a third-party email server 508. As discussed further below, the notification module 529 may transmit copies of an email 512 to the third-party email server 508 when the new recipient is associated with the third-party email server.

As indicated above, aspects of this disclosure may be employed to add or remove recipients to a previously delivered email. It will be appreciated, however, that email may be utilized as a form of record to prove when communications took place and what individuals were involved in those communications. During the discovery phase of litigation, for example, parties may produce documents that include emails, which may contain evidence relevant to the lawsuit. Part of that evidence may include the recipients of an email as well as the date and time the email was sent. It will therefore be appreciated that a mechanism to identify when an individual was added to or removed from an email may be beneficial to preserve the evidentiary value of the email.

In this regard, the email server 502 may further include a change log 528 that logs any updates to the emails 512 stored at the email server. The entries in the change log 528 may identify the email 512 that was updated (e.g., via a unique identifier associated with the email), the date and time the update occurred, and the nature of the update—e.g., whether a recipient was added to or removed from the email, and the email address of the recipient that was added or removed. In some example implementations, the email server 502 may maintain one change log for all emails 512 stored at the email server. In other example implementations, the email server 502 may maintain individual change logs for each of the emails 512 respectively.

Figure 6:
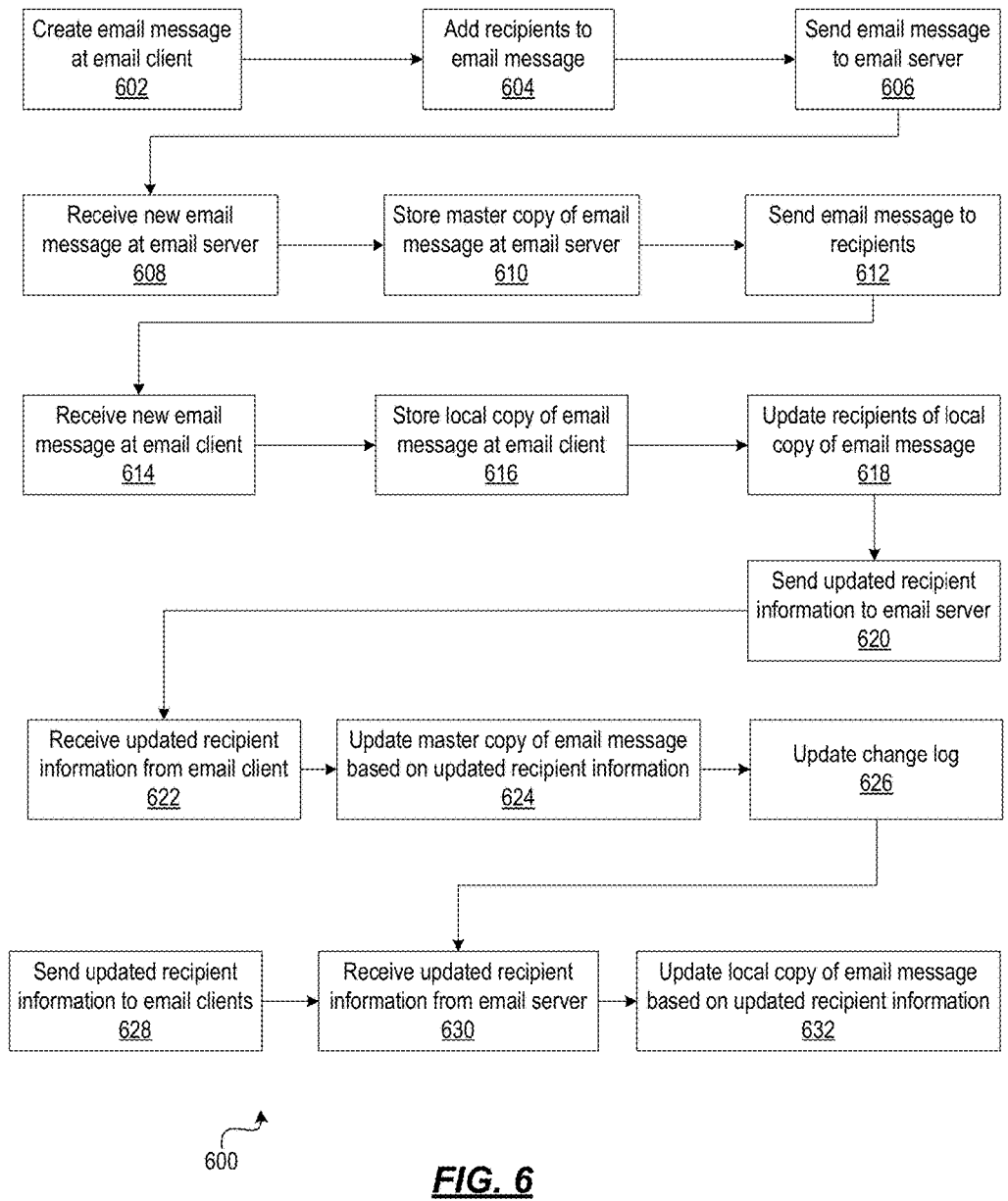
FIG. 6 depicts a flowchart of example method steps for updating the list of recipients of a previously delivered electronic message.

FIG. 6 depicts a flowchart 600 of example method steps for updating the list of recipients of a previously delivered electronic message, e.g., an email message. A user at an email client of a computing device may create a new email message (block 602). The user may add one or more recipients to the list of recipients of the email message (block 604). The recipients may include general recipients, cc recipients, bcc recipients, and combinations of the same. The user may send the new email message to the email server via the email client (block 606) and the email server may receive the new email from the email client, e.g., via a network such as the Internet (block 608). The email server may store a master copy of the email as described above (block 610) and associate the master copy of the email with the mailboxes of the recipients associated with the email server. The email server may also transmit the email to any third-party email servers for recipients associated with those third-party email servers, e.g., via the notification module. The email server may then send the email to the email clients of the recipients listed in the email (block 612). As noted above, the email server may send a copy of the email to the email clients of the recipients via a push method of delivery, a request-response method of delivery, or a sync method of delivery. The email client of a recipient may receive the email from the email server (block 614) and store a local copy of the email at the email client (block 616). Having successfully delivered the email to one or more recipients at this point, the email may be considered to be a previously delivered email.

Having received an email, an individual (e.g., the sender of the original email or one of the recipients) may update the list of recipients of the previously delivered email (block 618). As noted above, the individual may add a new recipient to the list of recipients or remove a current recipient from the list of recipients. The email client may then send recipient information to the email server (block 620). The email client may be configured to send the recipient information automatically or in response to receipt of user input from the individual. As an example, the email client may be configured to send the recipient information in response to manual selection of an "Update" button at the email client. The "Update" button may, for example, call an update function provided by the API at the email server to invoke the functionality of the update module as discussed above. As another example, the email client may be configured to detect the change to the list of recipients and automatically send the email server the recipient information when a change to the list of recipients is detected, e.g., via a push method of delivery. In still another example, the email client may be configured to provide the recipient information during a periodic sync process between the email client and the email server. For example, the email client may submit a sync request to the email server (or vice versa) to initiate the sync process.

The email server may receive from the email client the information regarding the updated recipient list (block 622) and update the master copy of the email based on the information received (block 624), e.g., by adding or removing one or more recipients from the list of recipients of the master copy of the email. In some instances, the recipient information may indicate one or more new recipients to add to the email as well as one or more recipients to remove from the email. As noted above, the recipient information may indicate that recipients should be added to or removed from the general recipients, the cc recipients, and/or the bcc recipients. The email server may also add a new entry to the change log indicating the changes made to the list of recipients of the email (block 626).

Having updated the master copy of the email, the email server may then send the recipient information to the other recipients (block 628), e.g., via a push, request-response, or sync method of delivery. The email client of one of the recipients may receive the recipient information from the email server (block 630), and update the local copy of the email message based on the recipient information received (block 632). Updating master copies and local copies of emails is discussed in further detail below.

Figure 7:
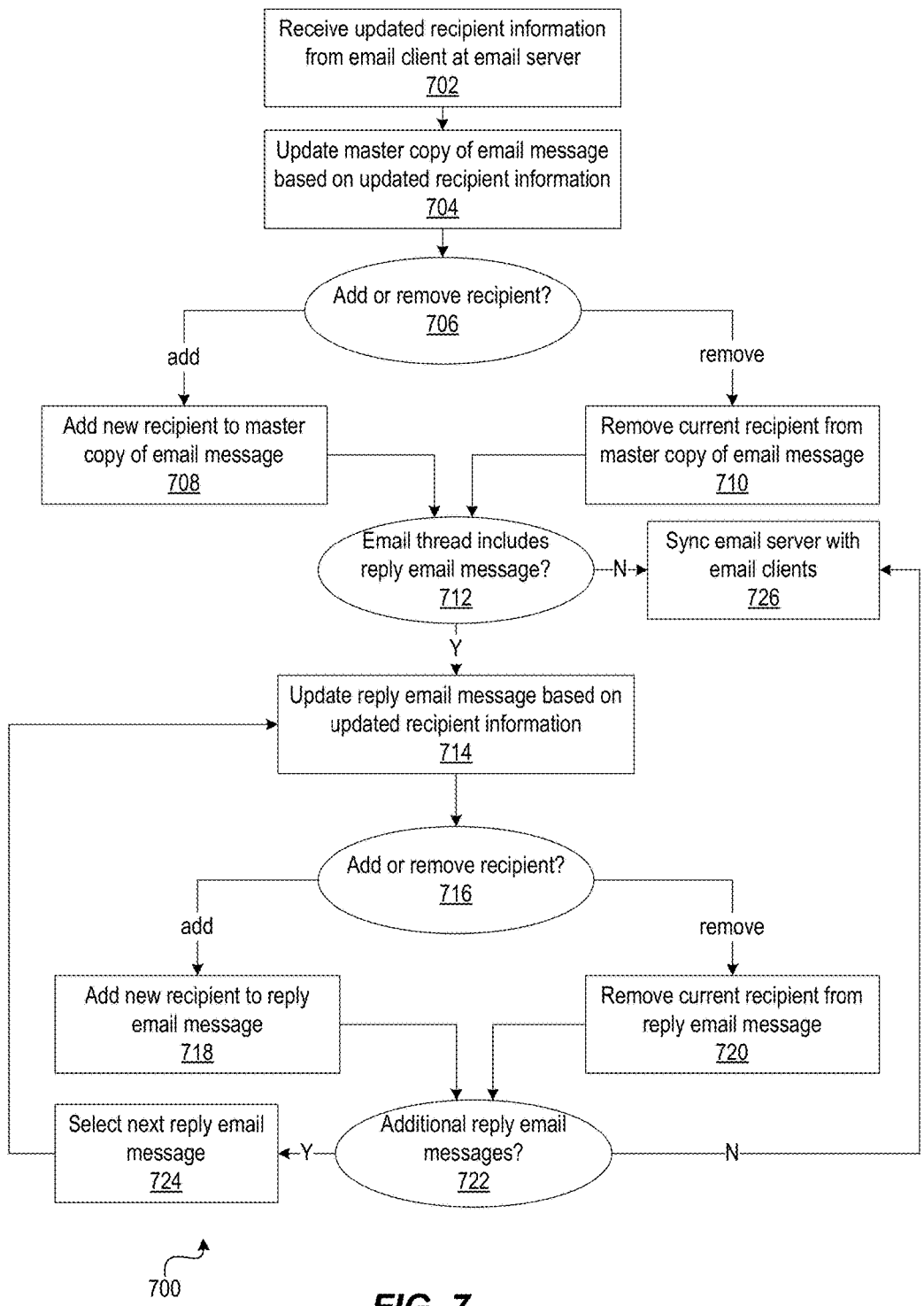
FIG. 7 depicts another flowchart of example method steps for updating a list of recipients of a previously delivered electronic message.

FIG. 7 depicts another flowchart 700 of example method steps for updating the list of recipients of a previously delivered electronic message, e.g., an email message. An email server may receive from an email client recipient information corresponding to an update to the list of recipients of an email (block 702). The email server may thus initiate the update of the master copy of the email based on the recipient information (block 704). If the recipient information indicates a new recipient should be added to the email (block 706:add), then the email server may add an email address associated with the new recipient to the list of recipients of the master copy of the email (block 708). If the recipient information indicates a current recipient should be removed from the email (block 706:remove), then the email server may remove the email address associated with that recipient from the list of recipients of the master copy of the email (block 710). As noted above, the recipient information may identify one or more new recipients to add to the list of recipients as well as one or more current recipients to remove from the list of recipients.

The email server may also be configured to update the list of recipients of any reply emails associated with the updated email. Accordingly, if the email thread for the updated email includes a reply email (block 712:Y), then the email server may update that reply email based on the recipient information received from the email client (block 714). Again, if the recipient information identifies a new recipient to add to the reply email (block 716:add), then the email server may add the email address associated with the new recipient to the list of recipients of the reply message (block 718). If the recipient information identifies a current recipient to remove from the list of recipients of the reply email (block 716: remove), then the email server may remove the email address associated with that recipient from the list of recipients for the reply email (block 720).

If the email thread includes additional reply messages (block 722:Y), then the email server may select the next reply email (block 724) and repeat the steps to update the next reply email. If the email thread does not include additional reply emails (block 722:N) or any reply emails at all (block 712:N), then the email server may send the recipient information to the email clients associated with the recipients of the updated email, e.g., by syncing the master copies of the emails at the email server with the local copies of the emails at the email clients (block 726).

Figure 8:
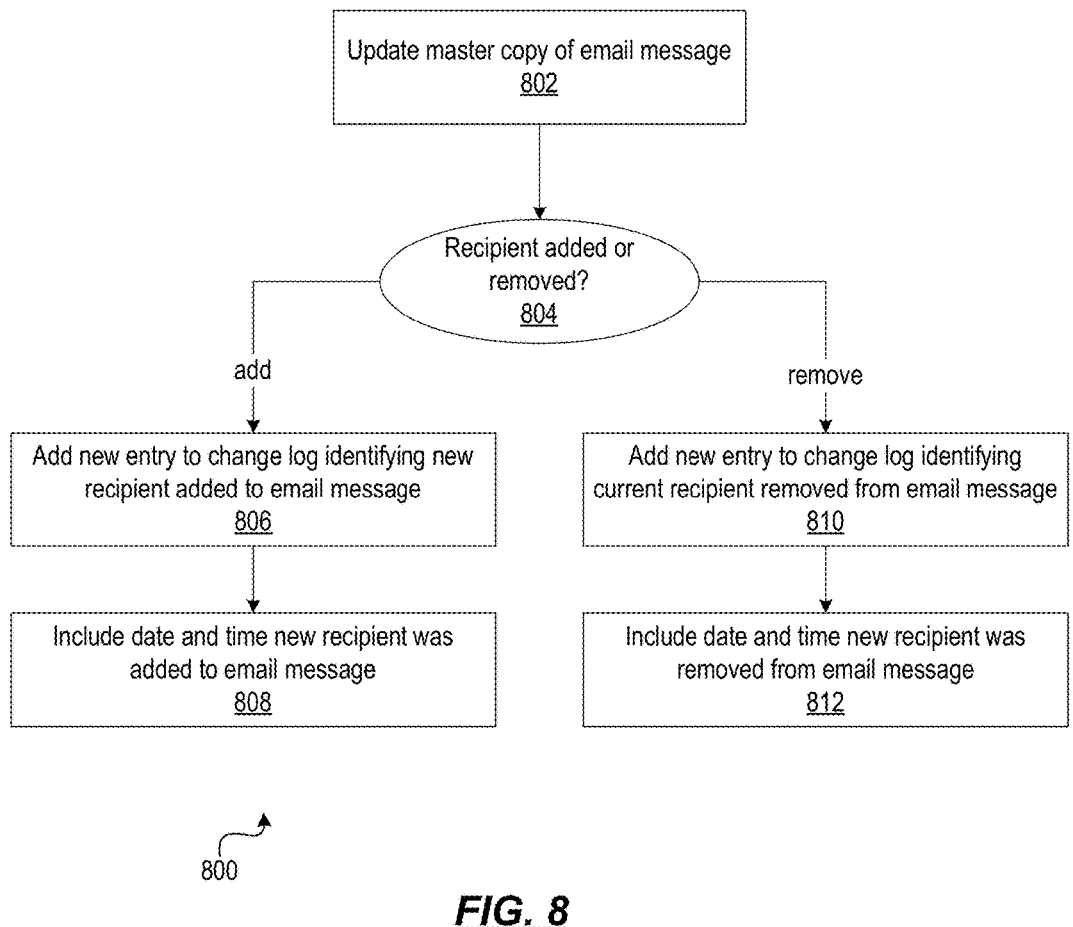
FIG. 8 depicts a flowchart of example method steps for updating a change log when updating a list of recipients of a previously delivered electronic message.

FIG. 8 depicts a flowchart 800 of example method steps for updating a change log when updating the list of recipients of a previously delivered electronic message, e.g., an email message. As described above, the email server may update the master copies of emails based on recipient information received from email clients (block 802). If the email server adds a new recipient to an email (block 804: add), then the email server may also add a new entry to the change log identifying, e.g., the email address that was added to the list of recipients of the updated email (block 806). The email server may include in the new change log entry the date and time that the new recipient was added to the list of recipients (block 808). If the email server removes a current recipient from an email (block 804:remove), then the email server may add a new entry to the change log identifying, e.g., the email address that was removed from the list of recipients of the updated email (block 810). The email server may likewise include in the new change log entry the date and time that the removed recipient was removed from the list of recipients (812).

Figure 9:
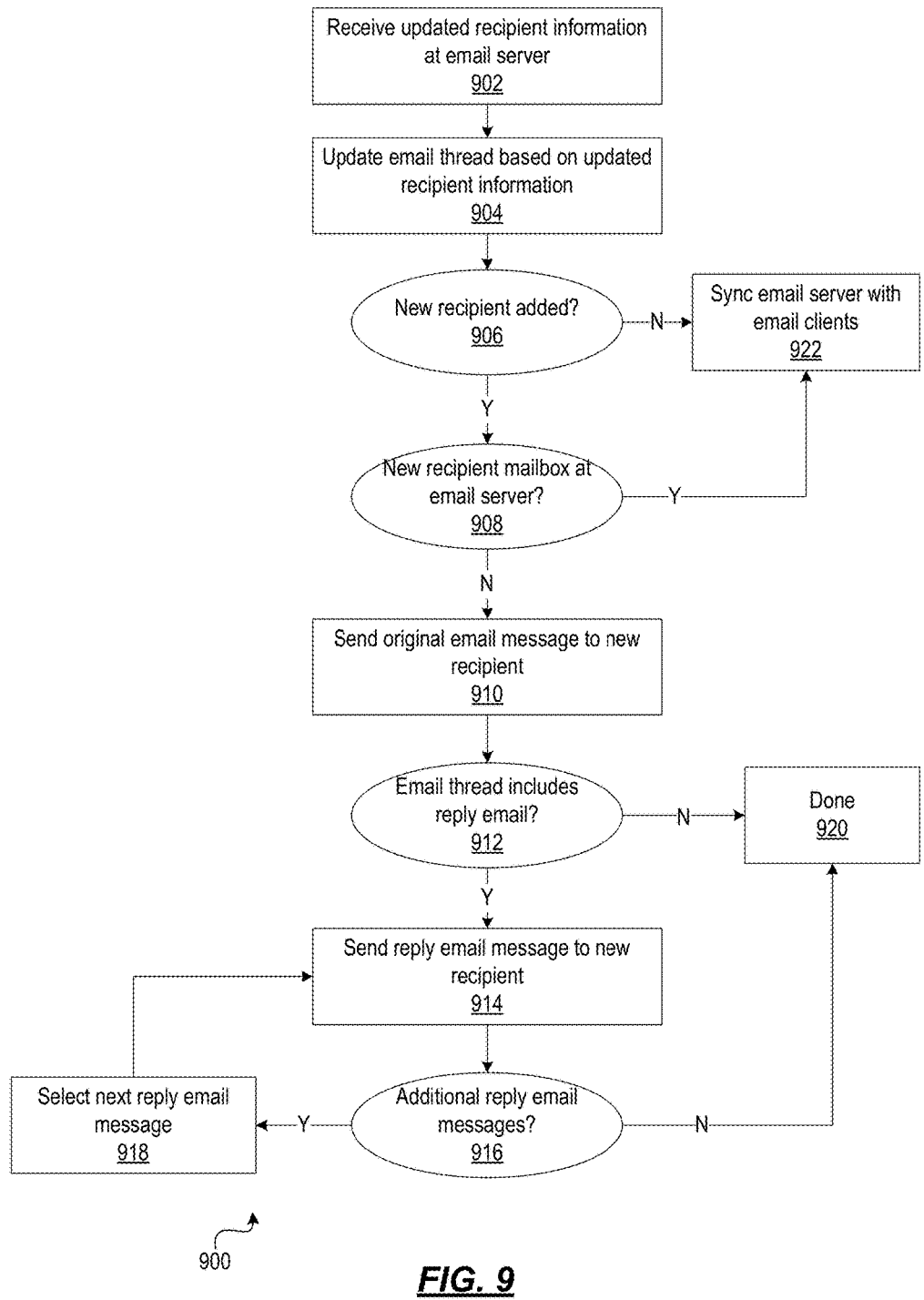
FIG. 9 depicts a flowchart of example method steps for providing email messages to a new recipient added to a previously delivered electronic message.

FIG. 9 depicts a flowchart 900 of example method steps for providing email messages to a new recipient that has been added to a previously delivered email message. As noted above, a recipient may be associated with an email address that is associated with a third-party email server (e.g., domain_2.com). Accordingly, the mailbox for that new recipient may be located at the third-party email server. Nevertheless, the email server may be configured to provide the third-party email server with emails the new recipient is added to.

As described above, the email server may receive recipient information from an email client (block 902) and update the recipient lists of the emails in the email thread based on that information (block 904). If the information identifies a new recipient to add to an email (block 906:Y) and the email server does not maintain the mailbox for that new recipient (block 908:N), then the email server may send the original email of the email thread to the third-party email server for delivery to the new recipient (block 910). In this way, the email server and the third-party email server may provide the email to the new recipients added to the email.

If the email thread includes a reply email (block 912:Y), then the email server may also send the reply email to the third-party email server for delivery to the new recipient (block 914). If the email thread includes additional reply emails (block 916:Y), the email server may select the next email in the reply thread (block 918) and repeat the steps to send the next reply email to the third-party email server. If the email thread does not include additional reply emails (block 916:N) or any replay emails at all (block 912:N), then the email server may conclude the process of providing the third-party email server with the emails of an email thread a new recipient was added to (block 920). If the email server does not need to update a third-party email server, e.g., if the information regarding the updated list of recipients does not identify a new recipient to add (block 906:N) or if the email server maintains the mailbox for the new recipient (block 908:Y), then the email server may, e.g., sync the master copies of the emails with the local copies of the emails at the email clients (block 922).

The aspects described and principles set forth above provide various technical advantages. As noted above, conventional approaches to including a new recipient in a message thread may involve sending a reply message with the new recipient included in the list of recipients of the reply message. This approach, however, may be unsuccessful if the other recipients continue to send reply messages to the original message thread that does not include the new recipient. Having multiple message threads may increase the volume of messages transmitted and stored thereby increasing the amount of computing resources consumed, e.g., storage space, network bandwidth, and processing cycles. By adding new recipients to previously delivered electronic messages, the approach described herein avoids superfluous messages and message threads thereby reducing the storage space, network bandwidth, and processing cycles consumed when an intended recipient is left off of an electronic message.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method of managing electronic messages comprising:
    storing, at an electronic message server, a previously delivered electronic message comprising a list of recipients the previously delivered electronic message has been delivered to;
    receiving, from a first electronic message client, recipient information identifying a new recipient to be added to the list of recipients of the previously delivered electronic message;
    updating the previously delivered electronic message by including the new recipient in the list of recipients of the previously delivered electronic message;
    providing the recipient information to a second electronic message client that stores a copy of the previously delivered electronic message comprising the list of recipients; and
    wherein receipt of the recipient information at the second electronic message client causes the second electronic message client to update the copy of the previously delivered electronic message by including the new recipient in the list of recipients of the copy of the previously delivered electronic message.

2. The method of claim 1 wherein:
    the previously delivered electronic message is an email; and
    the recipient information includes an email address associated with the new recipient.

3. The method of claim 1 wherein providing the recipient information to the second electronic message client includes pushing the recipient information to the second electronic message client upon receipt of the recipient information from the first electronic message client.

4. The method of claim 1 where providing the recipient information to the second electronic message client includes providing the recipient information to the second electronic message client in response to a sync request received from the second electronic message client.

5. The method of claim 1 further comprising:
    storing, at the electronic message server, a change log associated with the previously delivered electronic message; and
    updating the change log based on the recipient information such that the change log identifies the new recipient included in the list of recipients of the previously delivered electronic message.

6. The method of claim 5 wherein the recipient information includes date information and further comprising updating the change log based on the date information such that the change log identifies a date on which the new recipient was included in the list of recipients of the previously delivered electronic message.

7. The method of claim 1 further comprising:
    receiving, from the first electronic message client, additional recipient information identifying a current recipient to be removed from the list of recipients of the previously delivered electronic message;

updating the previously delivered electronic message by removing the current recipient from the list of recipients of the previously delivered electronic message;

providing the additional recipient information to the second electronic message client; and wherein receipt of the additional recipient information at the second electronic message client causes the second electronic message client to update the copy of the previously delivered electronic message by removing the current recipient from the list of recipients of the copy of the previously delivered electronic message.

8. The method of claim 7 further comprising, for each recipient in the list of recipients of the previously delivered electronic message, associating a status with the recipient wherein the status indicates whether the recipient is either a current recipient or a removed recipient.

9. The method of claim 7 wherein the additional recipient information includes date information and further comprising updating a change log associated with the previously delivered electronic message such that the change log identifies a date on which the current recipient was removed from the list of recipients of the previously delivered electronic message.

10. A system for managing electronic messages comprising:
one or more processors;
a data store storing a previously delivered electronic message comprising a list of recipients the previously delivered electronic message has been delivered to; and
memory storing instructions that, when executed by one of the one or more processors, cause the system to:
receive, from a first electronic message client, recipient information that identifies a new recipient to be added to the list of recipients of the previously delivered electronic message;
update the previously delivered electronic message by including the new recipient in the list of recipients of the previously delivered electronic message;
provide the recipient information to a second electronic message client that stores a copy of the previously delivered electronic message comprising the list of recipients; and
wherein receipt of the recipient information at the second electronic message client causes the second electronic message client to update the copy of the previously delivered electronic message by including the new recipient in the list of recipients of the copy of the previously delivered electronic message.

11. The system of claim 10 wherein:
the previously delivered electronic message is an email; and
the recipient information includes an email address associated with the new recipient.

12. The system of claim 10 further comprising a change log associated with the previously delivered electronic message wherein the instructions, when executed, further cause the system to update the change log based on the recipient information such that the change log identifies the new recipient included in the list of recipients of the previously delivered electronic message.

13. The system of claim 12 wherein the recipient information includes date information and wherein the instructions, when executed, further cause the system to update the change log based on the date information such that the change log identifies a date on which the new recipient was included in the list of recipients of the previously delivered electronic message.

14. The system of claim 10 wherein:
the instructions when executed, further cause the system to:
receive, from the first electronic message client, additional recipient information that identifies a current recipient to be removed from the list of recipients of the previously delivered electronic message,
update the previously delivered electronic message by removing the current recipient from the list of recipients of the electronic message, and
provide the additional recipient information to the second electronic message client; and
receipt of the additional recipient information at the second electronic message client causes the second electronic message client to update the copy of the previously delivered electronic message by removing the current recipient from the list of recipients of the copy of the previously delivered electronic message.

15. The system of claim 14 wherein the instructions, when executed, further cause the system to update a change log associated with the previously delivered electronic message such that the change log identifies a date on which the current recipient was removed from the list of recipients of the previously delivered electronic message.

16. The system of claim 10 wherein:
the previously delivered electronic message is associated with an electronic message thread comprising one or more additional previously delivered electronic messages, wherein each of the one or more additional previously delivered electronic messages comprises an individual list of recipients the respective additional previously delivered electronic message has been delivered to; and
the instructions, when executed, further cause the system to, for each of the one or more additional previously delivered electronic messages, update the list of recipients of the respective additional previously delivered electronic message by including the new recipient in the list of recipients of the respective additional previously delivered electronic message.

17. The system of claim 16 wherein:
the second electronic message client stores, for each of the one or more additional previously delivered electronic messages, a copy of the respective additional previously delivered electronic message comprising the individual list of recipients; and
receipt of the recipient information at the second electronic message client causes the second electronic message client to, for each of the one or more additional previously delivered electronic messages, update the copy of the respective additional previously delivered electronic message by including the new recipient in the individual list of recipients of the copy of the respective additional previously delivered electronic message.

18. The system of claim 10 wherein the instructions, when executed, further cause the system to determine whether the new recipient is associated with a third-party electronic message system and, in response to a determination that the new recipient is associated with the third-party electronic message system, transmit to the third-party electronic message system a copy of the previously delivered electronic message addressed to the new recipient.

19. The system of claim 18 wherein:
the previously delivered electronic message is associated with an electronic message thread comprising one or more additional previously delivered electronic messages; and
the instructions, when executed, further cause the system to transmit to the third-party electronic message system each of the one or more additional previously delivered electronic messages of the electronic message thread in response to a determination that the new recipient is associated with the third-party electronic message system.

20. The system of claim 10 wherein the instructions, when executed, further cause the system to either (i) push the recipient information to the second electronic message client, or (ii) provide the recipient information to the second electronic message client in response to receipt of a sync request from the second electronic message client.

* * * * *